(12) United States Patent
Rabeler

(10) Patent No.: US 6,629,116 B1
(45) Date of Patent: Sep. 30, 2003

(54) RANDOM SEQUENCE GENERATORS

(75) Inventor: Thorwald Rabeler, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/566,060

(22) Filed: May 5, 2000

(51) Int. Cl.$^7$ .................................................. G06F 1/02
(52) U.S. Cl. ...................................... 708/250; 708/253
(58) Field of Search ............................... 708/250, 252, 708/253, 254, 256

(56) References Cited

U.S. PATENT DOCUMENTS

| | | | | |
|---|---|---|---|---|
| 3,885,139 A | * | 5/1975 | Hurd | 708/252 |
| 4,691,291 A | | 9/1987 | Wolfram | |
| 4,961,159 A | * | 10/1990 | McLeod et al. | 708/250 |
| 5,224,165 A | * | 6/1993 | Reinhardt et al. | 380/47 |
| 5,257,282 A | * | 10/1993 | Adkisson et al. | 708/253 |
| 5,331,581 A | * | 7/1994 | Ohkubo et al. | 708/253 |
| 5,754,762 A | | 5/1998 | Kuo et al. | |

FOREIGN PATENT DOCUMENTS

| | | |
|---|---|---|
| DE | 4139151 C2 | 6/1993 |
| EP | 0075713 A2 | 4/1983 |
| EP | 0333153 A2 | 9/1989 |

* cited by examiner

*Primary Examiner*—Chuong Dinh Ngo
(74) *Attorney, Agent, or Firm*—Michael Schmitt

(57) ABSTRACT

The present invention provides a random sequence generator for generating an output signal having random values. The generator comprises a plurality of cells inter-connected to one another such that each cell receives, as an input, an output from each cell connected thereto and generates a cell output based on a current value of the cell output and each cell output received. The plurality of cells include k subsets, each subset including n cells. A pre-selected cell from each of the k subsets generates an output and the output of the k pre-selected cells is provided as the output signal of the generator. In a specific embodiment, each of the cells is a linear cellular automaton, with k being an instruction width and k*n being an instruction length. The invention is particularly suitable for internal self-testing of a microcontroller in a smart card. This eliminates the need for external test contacts and thus prevents potential break-ins through the external contacts. The present invention allows a huge number of sequences to be generated, thus providing tremendous amount of randomness for a wide range of applications.

18 Claims, 8 Drawing Sheets

RANDOM SEQUENCE GENERATORS

BACKGROUND OF THE INVENTION

The invention generally relates to random sequence generators, and more particularly to cellular automaton devices for generating random sequence signals.

Random sequence generators have been used to generate random sequence signals in many applications. For example, they are used for generating random sequence signals in implementing randomized algorithms in computers. They are also used for generating instruction sequences for self-testing of microcontrollers, encryption in smart cards, and dithering in image processing.

A conventional random sequence generator in the form of linear cellular automaton device is schematically illustrated in FIG. 1. FIG. 2 shows an equivalent functional block diagram of the embodiment in FIG. 1. In FIG. 1, a plurality of linear cellular automatons or cells 10 are inter-connected to one another. Each cell 10 may optionally receive a one-bit input 12 from data and address busses and generates a one-bit output 14. Outputs 14 are loaded into an instruction register (not shown) as pseudo-random instruction sequences for use, for example, in self-testing of microcontrollers.

In each cell 10, a storage element 22, such as a flip-flop, stores a current value of output 14 for use to generate a next value of the output and for providing to adjacent cells 10 as input 32. Storage element 22 is connected to an exclusive-OR gate 24 via a control gate 26, which controls whether to allow the current value of output 14 to pass through control gate 26 for inputting to an exclusive-OR gate 24. For example, if control gate 26 has a coefficient $k_n$ equal to 1, the current value of output 14 is allowed to pass through the control gate. However, if the coefficient $k_n$ is equal to 0, the current value of output 14 cannot pass through control gate 26. The coefficient values ($k_n$, $k_{n+1}$, $k_{n+2}$, are determined from a mathematical lookup table which is well known in the art. For example, the coefficients are described in "Minimal Cost One-Dimensional Linear Hybrid Cellular Automata of Degree Through 500", Journal of Electronic Testing: Theory and Applications, 6,255-258 (1995), by Kevin Cattell and Shujian Zhang, the disclosure of which is hereby incorporated by reference.

Exclusive-OR gate 24 receives additional inputs 32 from adjacent cells 10. Inputs 32 are the current output values of adjacent cells 10. All of the inputs at gate 24 are exclusive-ORed and the result is the next value of output 14. Thus, the next value of output 14 is determined based on the combination of its current value, inputs 32 from adjacent cells and optional input 12.

In a specific example shown in FIG. 3, a linear cellular automaton device 40 that comprises a group of 24 cells 10, i.e., having a 24-bit length, is used to generate pseudo-random instruction sequences. In this example, it is assumed that the instruction width is 8 bit and optional inputs 12 are not provided.

Cellular automaton device 40 is organized into three byte sections: byte 1, byte 2 and byte 3, which are inter-connected to one another. Each byte section includes 8 cells 10, which are also inter-connected to one another. Cellular automaton device 40 generates 8-bit output sequences $B_1$, $B_2$ and $B_3$, which may be loaded into an instruction register (not shown). The output sequences $B_1$, $B_2$ and $B_3$ of cellular automaton device 40 are supposed to provide sufficient randomness for use in various applications. However, the randomness of these sequences is very limited, as will be illustrated FIGS. 4A–4C.

FIG. 4A shows that the next state of output $B_1$ for byte 1 is one of two possible states $B_{1-1}$ and $B_{2-2}$. The next state of output $B_1$ is determined based on its current state and the input value received from adjacent byte 2, which is either bit 0 or 1, as illustrated in FIG. 3. For example, if the input value from byte 2 is 0, the next state of output $B_1$ is $B_{1-1}$. On the other hand, if the input value from byte 2 is 1, the next state of output $B_1$ is $B_{1-2}$. Each of the next possible states $B_{1-1}$ and $B_{1-2}$ may have 256 values.

Similarly, FIG. 4B shows that the next state of output $B_2$ for byte 2 is one of four possible states $B_{2-1}$, $B_{2-2}$, $B_{2-3}$ and $B_{2-4}$. FIG. 4C shows that the next state of output $B_3$ for byte 3 is one of two possible states $B_{3-1}$ and $B_{3-2}$.

As can be seen from the above, only a limited number of states can be generated by cellular automaton-device 40 due to the insufficient connections between the byte sections. As a result, the sequences generated do not provide sufficient randomness such that use of these sequences will inevitably result in inefficiencies and errors and could even cause serious security problems if used for encryption purposes.

Another conventional random sequence generator with similar problems is described in U.S. Pat. No. 4,691,291 issued to Wolfram on Sep. 1, 1987, which is hereby incorporated by reference.

Thus, there is a need for a random sequence generator that can generate a large number of states that provide sufficient randomness for a variety of applications.

SUMMARY OF THE INVENTION

The present invention provides a random sequence generator for generating an output signal having random values. The generator comprises a plurality of cells inter-connected to one another such that each cell receives, as an input, an output from each cell connected thereto and generates a cell output based on a current value of the cell output and each cell output received. The plurality of cells include k subsets each subset including n cells. A pre-selected cell from each of the k subsets generates an output and the output of the k pre-selected cells is provided as the output signal of the generator. In a specific embodiment, each of the cells is a linear cellular automaton, with k being an instruction width and k*n being an instruction length.

The invention is particularly suitable for internal self-testing of a micrbcontroller in a smart card. This eliminates the need for external test contacts and thus prevents potential break-ins through the external contacts.

The invention also provides a method for generating an output signal having random values from a plurality of inter-connected cells. The method comprises the steps of: (a) arranging the plurality of cells in k subsets, each subset including n cells; (b) applying to each of the cells, as an input, an output from each cell connected thereto; (c) generating a cell output from each of the cells based on a current value of the cell output and each cell output received; (d) extracting an output from a pre-selected cell of each of the k subsets; and (e) providing the output of the k pre-selected cells as the output signal.

By using the present invention, a huge number of sequences can be generated, thus providing tremendous amount of randomness for a wide range of applications.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, like reference symbols refer to identical elements.

DETAILED DESCRIPTION OF THE PREFERRED EMBODIMENTS

Figure 5:
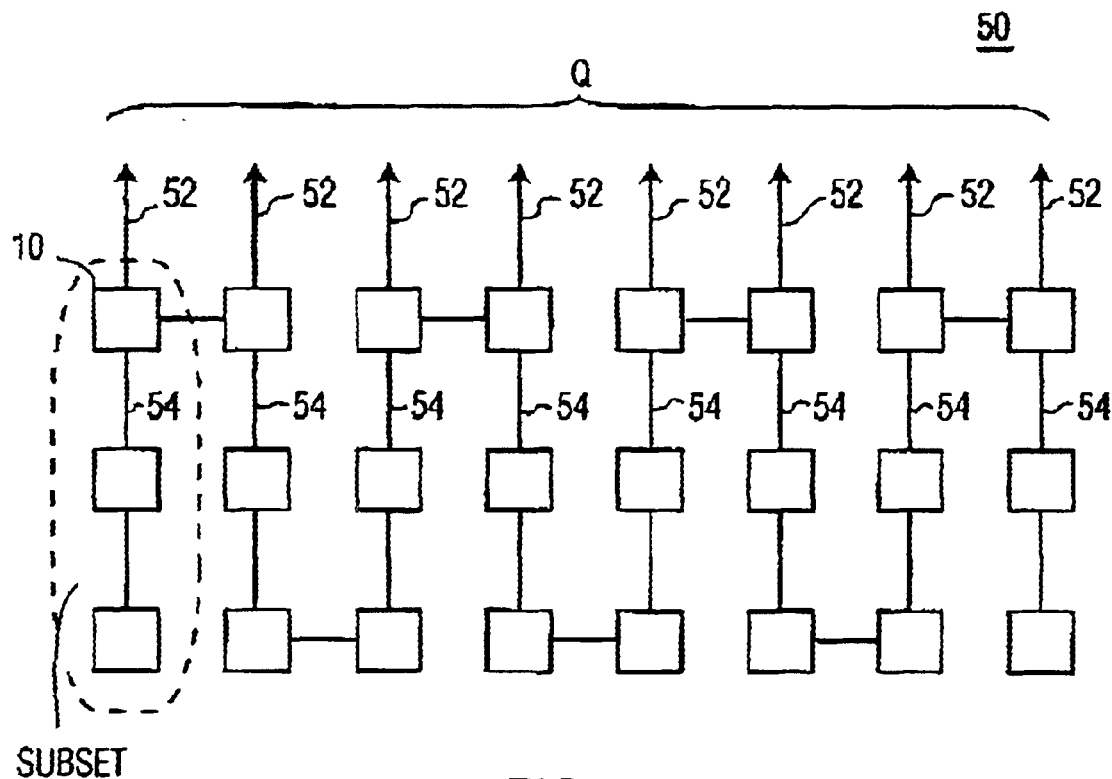
FIG. 5 shows a random sequence generator according to a specific embodiment of the invention.

In accordance with a specific embodiment of the invention, FIG. 5 shows a random sequence generator 50 in the form of a linear cellular automaton device having 24 cells 10 inter-connected to one another. It should be noted that for simplicity each connection line between two cells in FIGS. 5 and 7–9 comprises two lines in the same manner as illustrated in FIG. 1, so that adjacent connected cells provide inputs to each other.

Figure 1:
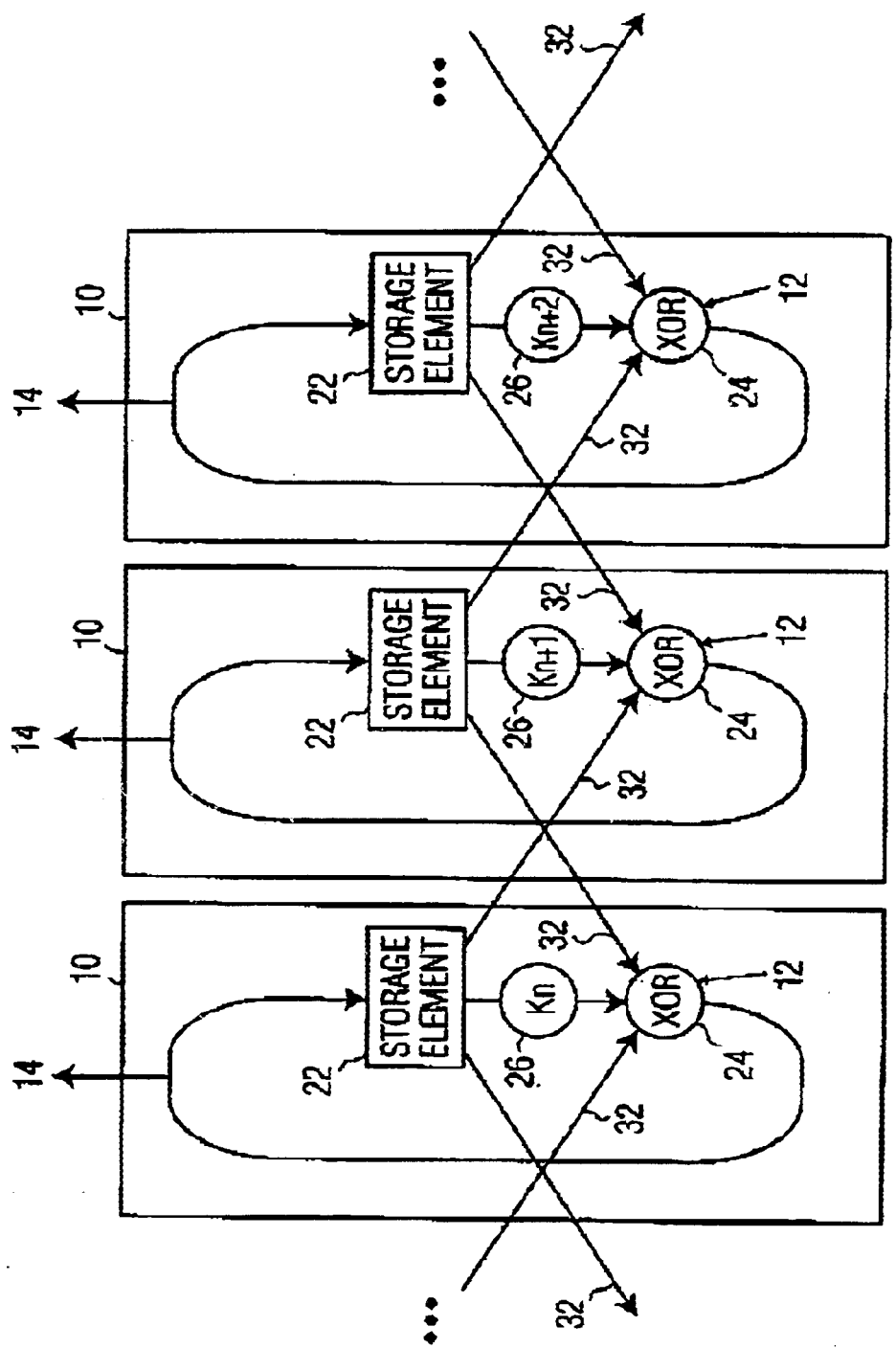
FIG. 1 shows schematically a conventional random sequence generator.
Figure 2:
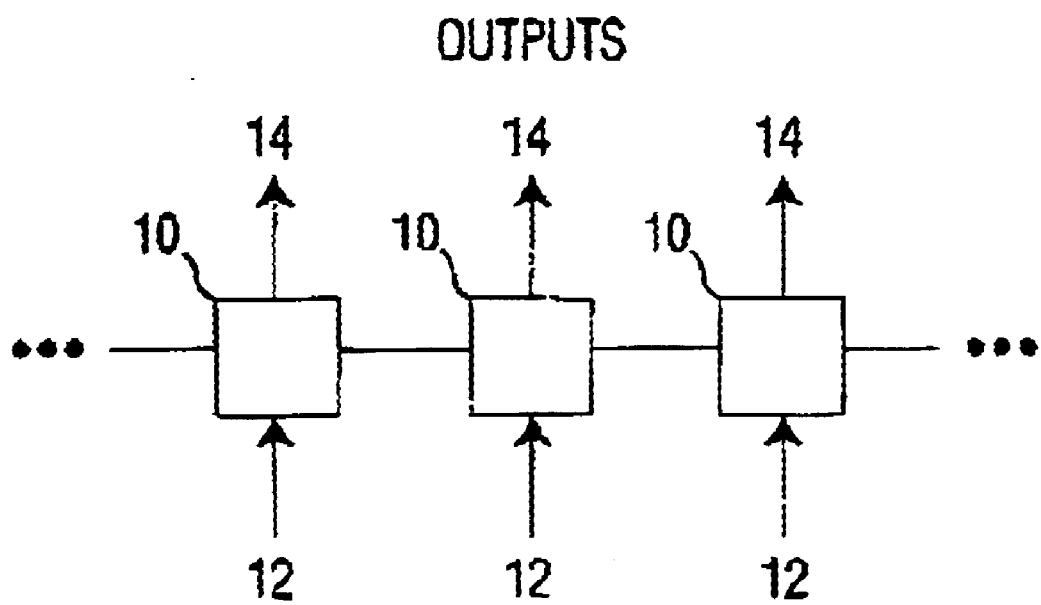
FIG. 2 shows an equivalent functional block diagram of the embodiment in FIG. 1.
Figure 3:
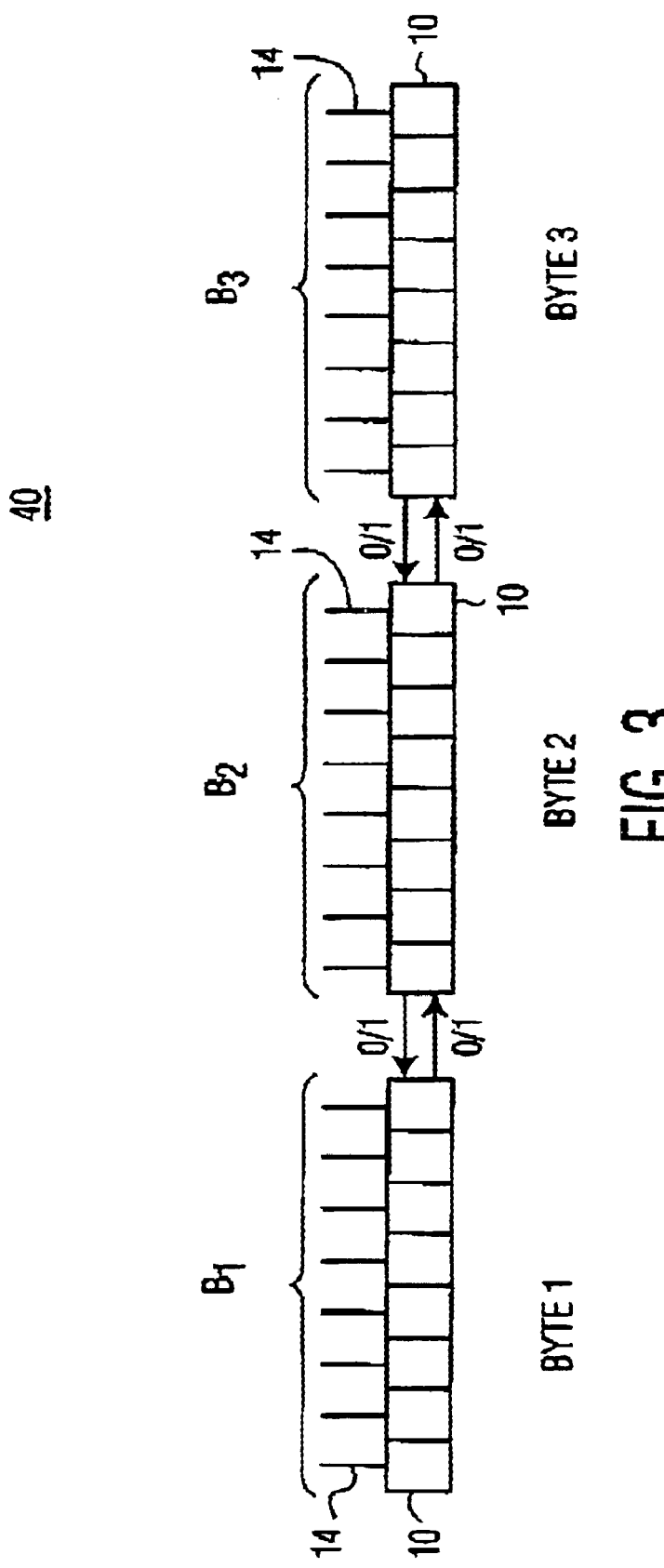
FIG. 3 depicts a conventional linear cellular automaton device.
Figure 4A:
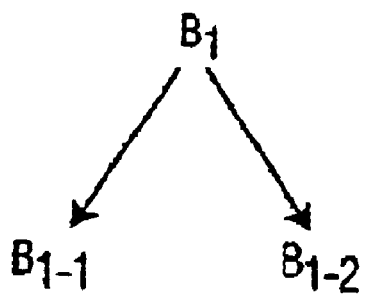
FIG. 4A–4C illustrate the number of states generated by the conventional linear cellular automaton device in FIG. 31.
Figure 4B:
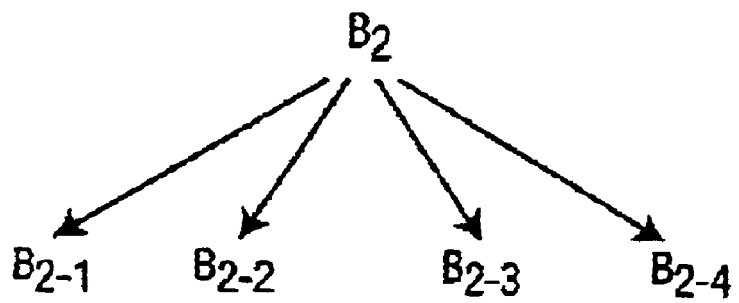
Figure 4C:
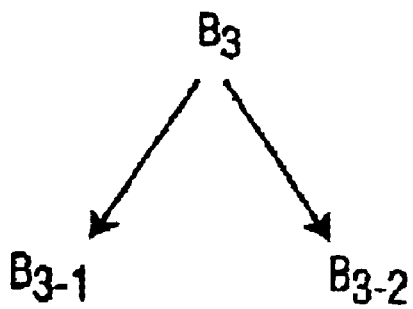

An example of cell 10 is schematically illustrated in FIG. 1. Although cell 10 is shown as a linear cellular automaton, it may alternatively be a non-linear cellular automaton. Furthermore, it will be understood that a larger number of cells may be used and that only 24 cells are illustrated here to simplify the explanation. In this embodiment, it is again assumed that the instruction width is 8 bit and optional inputs 12 are not provided.

Cells 10 are arranged so that they meander into a two-dimensional array. In this array, the cells are organized in 8 subsets and each subset includes 3 cells. The outputs 52 from the eight cells are extracted and provided as the 8-bit output Q of random sequence generator 50 for use in various applications. In this embodiment, the output sequences generated by random sequence generator 50 are significantly more randomized, as will be explained in connection with FIG. 6.

Figure 6:
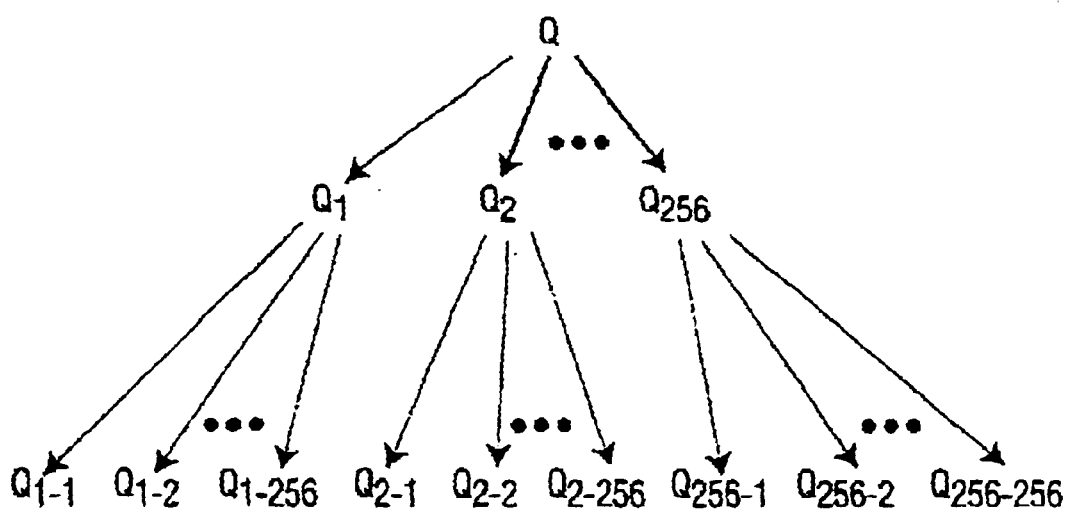
FIG. 6 illustrates the number of states generated by the random sequence generator in FIG. 5.

In FIG. 6, it is shown that the next state of output Q is one of $2^8$ or 256 possible states $Q_1, Q_2 \ldots$ and $Q_{256}$, since there are eight inputs 54 provided to the eight outputting cells 10 and each input 54 has two possible values (bit 0 or 1). Each of these 256 states again has a next state of one of 256 possible states (i.e., one of $Q_{1-1}, Q_{1-2}$, and $Q_{1-256}, Q_{2-1}, Q_{2-2}, \ldots$ and $Q_{2-256} \ldots$ or $Q_{256-1}, Q_{256-2}, \ldots$ and $Q_{256-256}$). Since each state may have 256 possible values, the next value of output Q has one of $(2^8 \times 2^8 \times 2^8 - 1)$ or 16,777,215 possible values, assuming the value of all 0's is not used. In this way, random sequence generator 50 generates a significantly large number of sequences that provide substantially more randomness than that provided by the sequences generated by the conventional random sequence generators.

It should be noted that although in the embodiment of FIG. 5, the 24 cells meander into a two-dimensional array, the invention is not limited to such arrangement. The cells can be arranged in any shape, e.g., in a straight line, or a circular shape, as long as the eight cells are selected such that they have the similar relative positions as those in FIG. 5.

Figure 7:
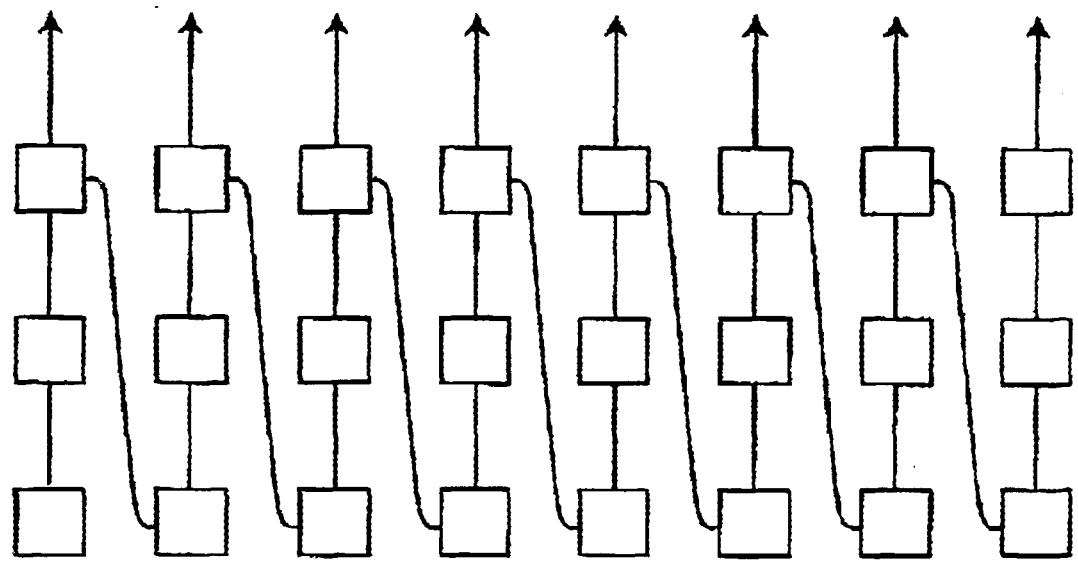
FIG. 7 shows a variation of the random sequence generator in FIG. 5.
Figure 8:
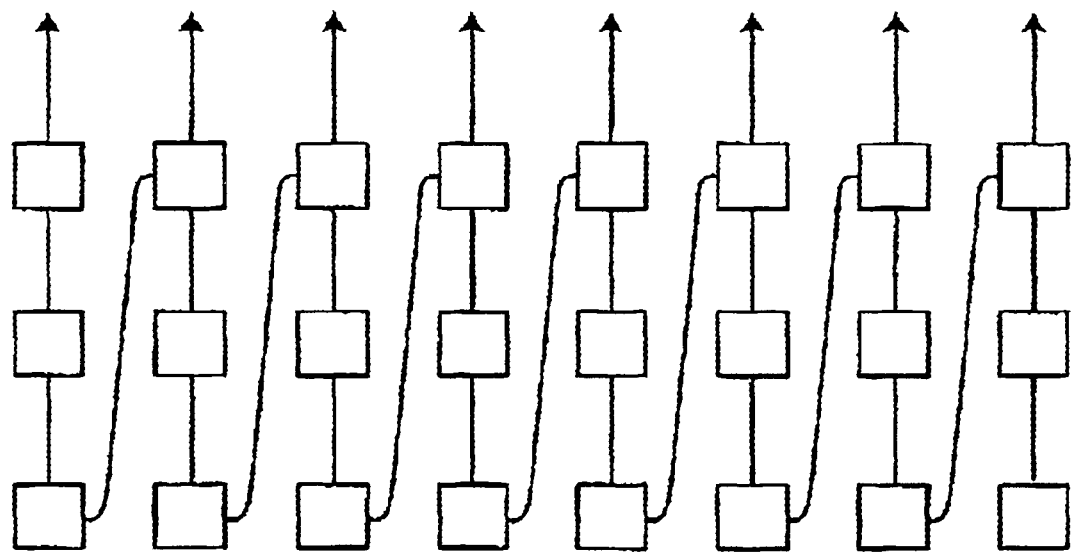
FIG. 8 shows another variation of the random sequence generator in FIG. 5.
Figure 9:
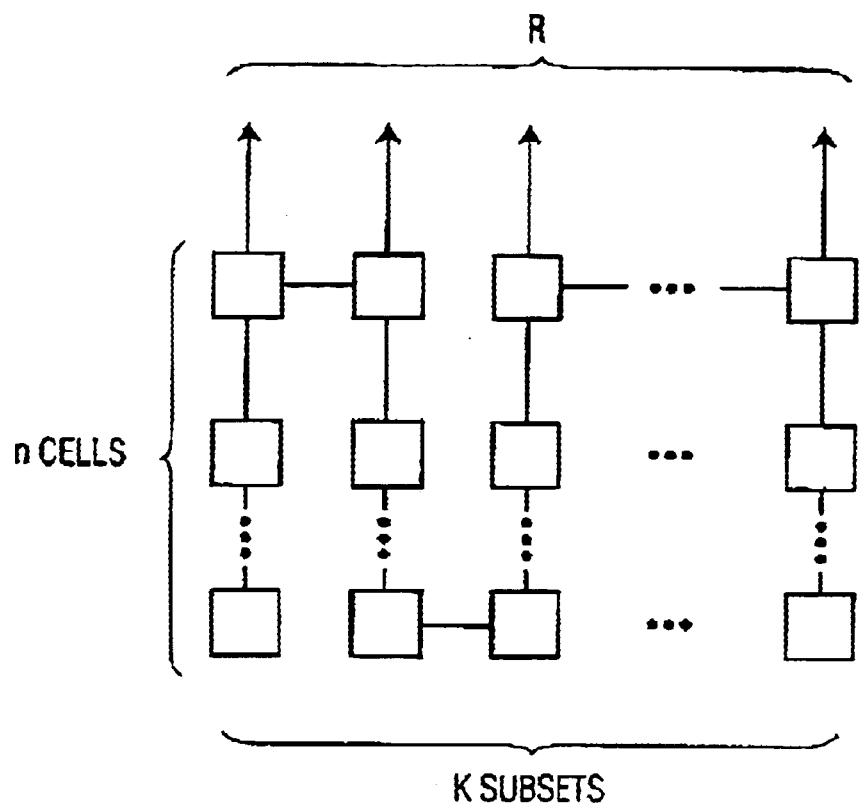
FIG. 9 shows a more generalized random sequence generator according to another embodiment of the invention.
Figure 10:
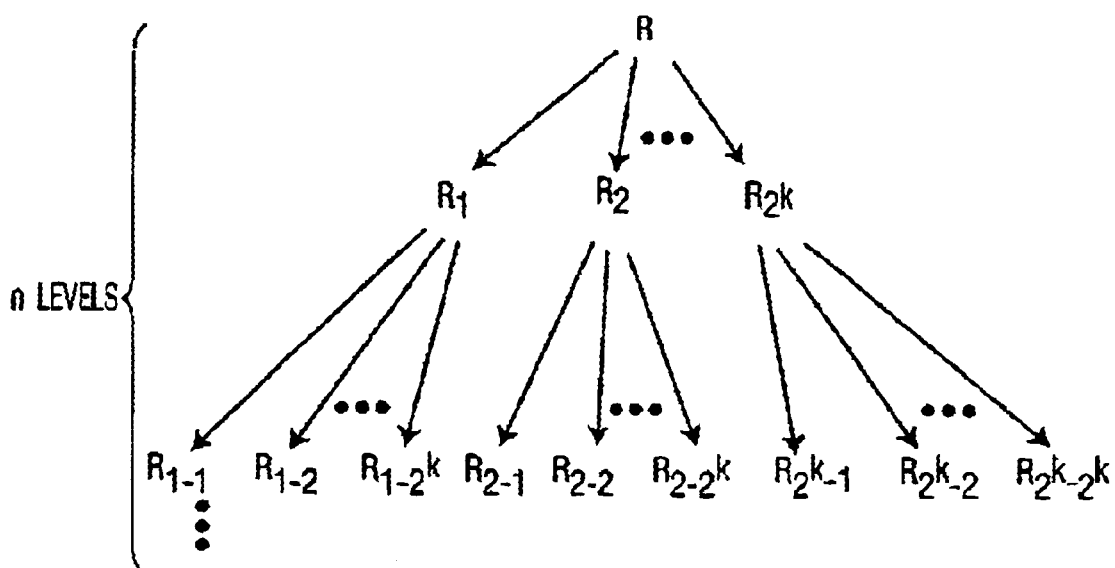
FIG. 10 illustrates the number of states generated by the random sequence generator in FIG. 9.

There are many possible variations of the embodiment in FIG. 5. Examples of such variations are shown in FIGS. 7 and 8. These variations have similar effects in generating random sequence signals.

As mentioned, the number of cells used according to the invention is not limited to those illustrated in the above. The principles of the invention also apply to a more generalized random sequence generator such as a linear cellular automaton device 60 shown in FIG. 9. Cellular automaton device 60 includes m cells and is organized in k subsets, where m corresponds to the instruction length and k corresponds to the instruction width. Each subset includes n cells. One cell in each of the k subsets is selected to provide a one-bit output, and the k-bit output is extracted as the output of cellular automaton device 60. In a similar manner as in FIG. 5, the next state of output R is one of $2^k$ possible states. Therefore, as illustrated in FIG. 101 the next value of output R has one of $(2^{k*n}-1)$ possible values, assuming again the value of all 0's is not used.

Figure 11:
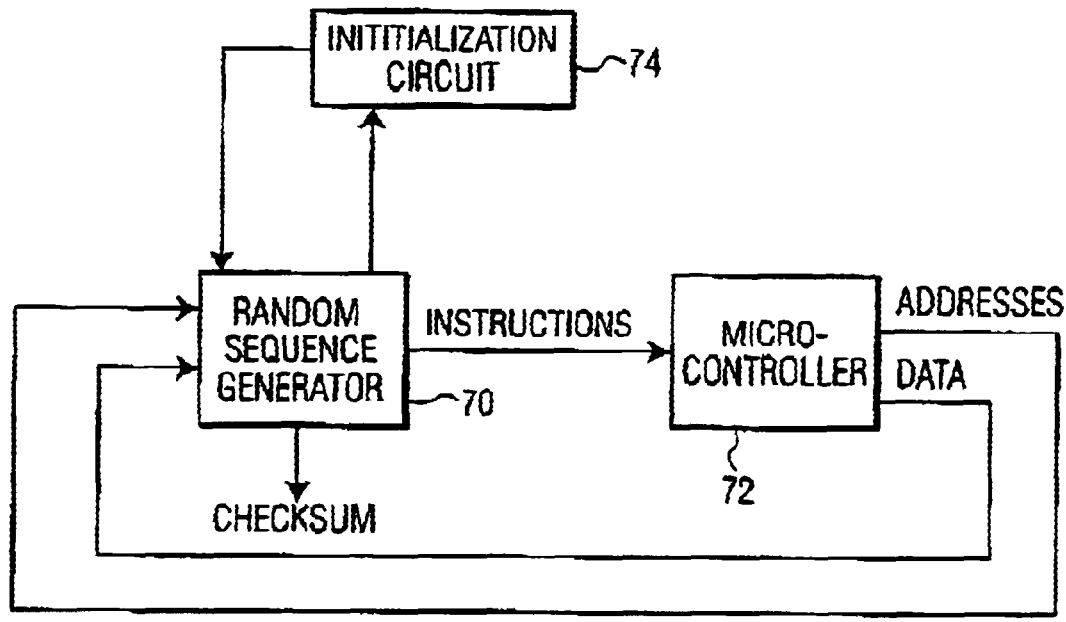
FIG. 11 shows an application of a random sequence generator according to the invention.

FIG. 11 shows an application of the invention in which self-testing of a microcontroller is implemented. In FIG. 11, a random sequence generator 70 according to the invention sends instructions to a microcontroller 72, which in turn generates addresses and data and feeds them back to random sequence generator 70. These feedback signals are equivalent to the optional inputs 12 shown in FIG. 1.

After a predetermined number of instructions have been sent, random sequence generator 70 generates a checksum of its current output. The checksum is compared with a reference value. If the comparison shows no discrepancy, the microcontroller passes the test and is ready to be used in a final product. An initialization circuit 74 detects whether the instruction and the address and data are all 0's at the same time. When this occurs, it will initialize the output of random sequence generator 70 to a non-zero value to avoid the deadlock since the value of all 0's is not used.

The random generator sequence of the invention is particularly suitable for smart card applications in which the random sequence generator is embedded in the smart card for self-testing of the internal microcontroller. A major advantage is that external contacts on smart cards for testing the internal microcontroller are no longer required. This prevents hackers from breaking in the smart card to steal valuable confidential data through the external contacts of the smart cards.

Figure 12:
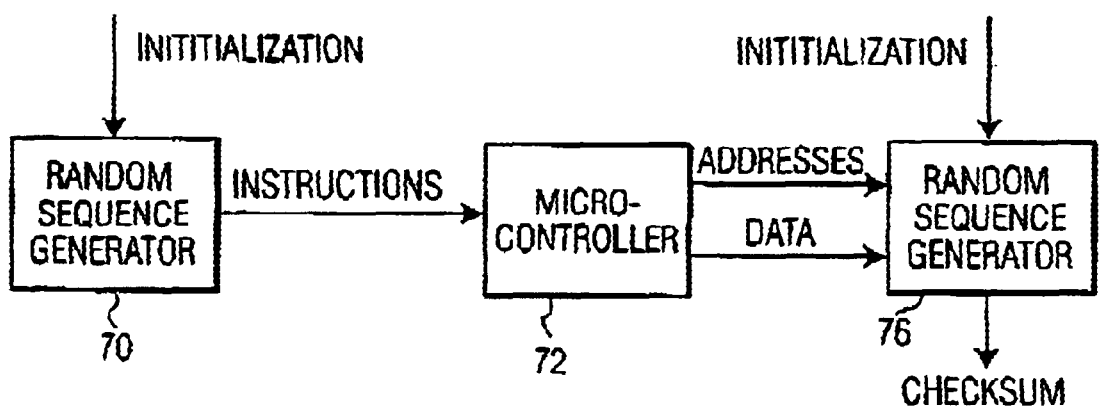
FIG. 12 shows an alternative application of a random sequence generator according to the invention.

FIG. 12 shows an alternative application of the invention. In this application, two random sequence generators 70 and 76 are used. Random sequence generator 70 according the invention is used as a stand-alone device without receiving the addresses and data fed back from microcontroller 72. The second generator 76 may or may not be made according to the invention. At the beginning of the operation, the output values of generators 70 and 76 are preset to some initial values. After a predetermined number of sequences have been sent to microcontroller 72, a checksum of the output sequence of generator 76 is generated and compared with a reference value to determine whether the microcontroller has passed the test.

Thus, by using the random sequence generators according to the invention, a very large number of sequences can be generated, thus providing sufficient randomness for various applications.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A random sequence generator for generating an output signal having random values, the generator comprising:

a plurality of cells inter-connected to one another such that each cell receives, as an input, an output from each cell connected thereto and generates a cell output based on a current value of the cell output and each cell output received;

wherein the plurality of cells include k subsets, each subset including n cells; and wherein a pre-selected cell from each of the k subsets generates an output and the output of the k pre-selected cells is provided as the output signal of the generator.

2. The generator of claim 1, wherein each of the cells receives an additional input from an external bus, and the cell output is generated based on the current value of the cell output, each cell output received and the additional input.

3. The generator of claim 1, wherein each of the cells is a cellular automaton.

4. The generator of claim 1, wherein k is equal an instruction width and k*n is equal to an instruction length.

5. The generator of claim 4, wherein each of the cells is a linear cellular automaton.

6. A linear cellular automaton device for generating an output signal having random values, the device comprising:

a plurality of automatons connected end to end, the plurality of automatons including k subsets, each subset including n automatons, wherein a pre-selected automaton from each of the k subsets generates an output and the output of the k pre-selected automatons is provided as the output signal of the device.

7. The device of claim 6, wherein each of the automatons receives an additional input from an external bus for use in generating an output of the automaton.

8. The device of claim 6, wherein k is equal an instruction width and k*n is equal to an instruction length.

9. A smart card, comprising:

a microcontroller;

a random sequence generator, connected to the microcontroller, for generating an output signal having random values for performing self-test of the microcontroller, the generator including:

a plurality of cells inter-connected to one another such that each cell receives, as an input, an output from each cell connected thereto and generates a cell output based on a current value of the cell output and each cell output received, wherein the plurality of cells include k subsets, each subset including n cells, wherein a pre-selected cell from each of the k subsets generates an output and the output of the k pre-selected cells is provided as the output signal of the generator;

wherein self-test of the micrbcontroller is performed without requiring external contacts.

10. The smart card of claim 9, wherein each of the cells receives an additional input from the microcontroller, and the cell output is generated based on the current value of the cell output, each cell output received and the additional input.

11. The smart card of claim 10, further comprising a detection circuit that detects occurrence of an event in which the output signal and the additional inputs from the microcontroller are all at a pre-defined non-used state, and upon occurrence of the event, the detection circuit initializing the generator to a predetermined state.

12. The smart card of claim 11, wherein after a predetermined number of random values have been generated, the generator generates a checksum for comparing with a reference value to determine whether the microcontroller has passed the self test.

13. The smart card of claim 9, wherein k is equal an instruction width and k*n is equal to an instruction length.

14. The generator of claim 13, wherein each of the cells is a linear cellular automaton.

15. A method for generating an output signal having random values, from a plurality of inter-connected cells, the method comprising the steps of:

(a) arranging the plurality of cells in k subsets, each subset including n cells;

(b) applying to each of the cells, as an input, an output from each cell connected thereto;

(c) generating a cell output from each of the cells based on a current value of the cell output and each cell output received;

(d) extracting an output from a pre-selected cell of each of the k subsets; and (e) providing the output of the k pre-selected cells as the output signal.

16. The method of claim 15, further comprising the step of applying an input to each of the cells from an external bus, and wherein step (c) includes generating the cell output based on the current value of the cell output, each cell output received and the additional input.

17. The method of claim 15, wherein each of the cells is a cellular automaton.

18. The method of claim 15, wherein k is equal an instruction width and k*n is equal to an instruction length.

* * * * *